Patented Sept. 17, 1946

2,407,713

UNITED STATES PATENT OFFICE 2,407,713

ERYTHRINA ALKALOID AND ITS PRODUCTION

Randolph T. Major, Mountainside, and Karl Folkers, Plainfield, N. J., assignors to Merck & Co., Inc., Rahway, N. J., a corporation of New Jersey No Drawing. Application April 30, 1941, Serial No. 391,096

14 Claims. (Cl. 260—236)

This invention relates to an alkaloid having important physiological activity and to processes for its production.

The alkaloids which applicants and their co-workers have produced for the first time from species of Erythrina cause, physiologically, a potent curare-like action, and certain of them have been found particularly useful for the release of spasm and plastic muscular rigidity in patients with spastic paralysis, and for the modification of the severity of the metrazol convulsions, thereby preventing fractures in the convulsive therapy of the psychoses.

We have discovered that species of Erythrina, a genus of plants found throughout South America, may be used as a source for the production of a number of different types of alkaloids. Thus, we have discovered that a "free" alkaloidal fraction may be obtained from which a number of individual alkaloids may be isolated.

We have also produced from species of the genus Erythrina, for the first time, not only the "free" alkaloidal fraction, but also other alkaloids which we have called "combined" alkaloids, because they are combined with an acid through an ester linkage.

These new "combined" alkaloids appear to be esters of sulfo-acetic acid, $HO_3SCH_2CO_2H$, and new alkaloidal molecules. This is evidenced by the fact that acid or alkaline hydrolysis of the new "combined" alkaloids yields two components for each "combined" alkaloid, the sulfo-acetic acid, and the alkaloidal portion, which has been called the "liberated" alkloid.

We have produced from species of Erythrina the "free" alkaloidal fraction, and the individual "free" 'alkaloids, which we have called, erythramine, erythratine, erythraline, and erythroidine. We have also produced a "combined" alkaloidal fraction, and the individual "combined" alkaloids, which we have called erysothiovine, erysothiopine, a "liberated" alkaloidal fraction, and the individual "liberated" alkaloids, which we have called erysodine, erysopine, erysovine, and erysonine.

These various types of alkaloids occur together, generally speaking, throughout the genus Erythrina, and processes for the selective production of any one of them must be carefully adapted to the nature of the particular type of alkaloid to be obtained.

The present invention is more particularly concerned with the individual "free" alkaloid, which we have called "erythroidine," and its production from seeds and dried flowers of the species of Erythrina, known as E. americana. Our alkaloid "erythroidine" is crystalline, has the empirical formula $C_{16}H_{19}NO_3$, is a lactone which is susceptible to destruction by strong alkalis, forms a crystalline hydrochloride of melting point about 228° C., appears to be a mixture of isomers, and is highly active as a motor paralysant. It has been used with notable success in so-called "shock therapy."

As disclosed in the co-pending related application, Serial No. 343,854 now Patent 2,391,013, filed July 3, 1940, it has been discovered that the species of Erythrina known as E. americana may not only be used as a source for the production of our alkaloid "erythroidine," but also for the production of the "liberated" alkaloids, erysodine and others. For this reason, particular care must be exercised in the treatment of E. americana in order to insure the selective production of our alkaloid "erythroidine," which we have produced in pure crystalline form with well-established characteristics.

Previously, Altamirano has reported the production of a crude extract from a species of Erythrina which he called E. coralloides (Gaceta Medica de Mexico, vol. 23, No. 18, pages 369–92, 1888). The Altamirano paper does not reveal any characterizing data by which the species of Erythrina with which he worked can be identified and classified, and it is impossible to determine the plant upon which his reported experiments were carried out. He reports that he produced a crystalline alkaloid from E. coralloides which he called coralloidine, but that such crystalline alkaloid was not a motor-paralyzing principle. Altamirano also reports his experiments on the mother liquors of his coralloidine extraction, but the experiments are not described in detail, no quantities of reagents, temperature conditions, or the like, being given. Altamirano states that from the mother liquors of his coralloidine extraction, he obtained a mixture of substances containing, among others, a small quantity of a material which he called "erythroidine" because it appeared to be different from the substance which he had called coralloidine.

It is impossible to repeat the experiments of Altamirano, due to the paucity of details given, and the fact that he has not identified the species of Erythrina with which he worked, and, therefore, it is impossible to identify the substance which he reports that he obtained in admixture with resinous and other foreign materials. That it is not the alkaloid which we have called "erythroidine" is clear, in the light of the brief discussion of his process given by Altamirano. For example, Altamirano states that in order to isolate his alkaloid from the crude extract, he utilized potassium hydroxide. He states that the extract was dissolved in water, alkalinized with potash solution, mixed with sulfuric ether, and agitated. He reports that in this way he isolated 0.52 gram of a substance, which he describes as follows: "colorless when fresh, but after having been exposed to the action of air for some time, changes to a red color; has a special odor, and a definitely alkaline action, soluble in water, giving it a milky appearance, deliquescent, amorphous; did not form the prismatic crystals of coralloidine with hydrochloric acid."

Our alkaloid "erythroidine" is distinguished from the substance described by Altamirano, nor could our "erythroidine" be obtained by the generalized processes described by him. Thus, in aqueous solution our alkaloid "erythroidine" is progressively hydrolyzed in the presence of potassium hydroxide, and, furthermore, it is sparingly soluble in ether. Also, it forms a crystalline hydrochloride.

Altamirano further reports that he mixed "colorin powder" with slaked lime, and that, after further treatment, he obtained an impure sulfate of the material he called "erythroidine." Our new alkaloid which we have called "erythroidine" is susceptible to destruction by strong alkalies, such as slaked lime.

In view of the difficulty encountered in attempting to follow the experimental data given by Altamirano, we have attempted to produce our alkaloid "erythroidine" from *Erythrina coralloides* DC. according to the method which we have found effective for its production from *Erythrina americana*, as disclosed in the following examples. We have been unable to obtain our alkaloid "erythroidine" from *E. coralloides* DC. by such processes.

Some confusion has existed as to the identity of the various species of Erythrina. Certain writers have confused *Erythrina americana* with *Erythrina coralloides* DC., and have also indicated that the word "Colorin" is another name for either or both of these species. The word "Colorin" has no pertinency, whatever, so far as the identification of a species of Erythrina is concerned. "Colorin" is a local name commonly used in Mexico to denote various plants bearing red seeds or fruits, and has been indiscriminately applied in various localities in Mexico to such different species of Erythrina, as *E. breviflora* DC., *E. leptorhiza* DC., *E. herbacea* L., *E. coralloides* DC., *E. flabelliformis* Kearney, *E. lanata* Rose, *E. occidentalis* Standley, *E. americana*, *E. mexicana* Krukoff, and *E. Folkersii* Krukoff & Moldenke, among others. The name "Colorin" has been applied also to species of plants that do not belong with the genus Erythrina such as, for example, *Rivina humilis* L., *Sophora secundiflora* (Ortega) Lag., *Dolicholus phaseoloides* (Swartz) Kuntze, *Capparis indica* (L.) Fawc. & Rendle, and others.

The species *E. americana* and *E. coralloides* DC. are not identical and they are, in fact, classified in different subgroups of the genus Erythrina, *E. americana* being classified in subgroup Americanae while *E. coralloides* DC. is classified in subgroup Lanatae. The characteristics of *E. americana* and *E. coralloides* DC. are discussed in detail in the monograph by B. A. Krukoff, "The American Species of Erythrina," (published in "Brittania," 1939, vol. 3, #2, pages 205–337).

The following comparisons, taken from the monograph, serve to clearly distinguish the species from each other:

| *Erythrina americana* | *Erythrina coralloides* DC. |
|---|---|
| Small or medium-sized tree, usually leafy at anthesis, armed with spines. | Shrub or small tree, armed with spines, aphyllous or with young leaves at anthesis. |
| Branchlets: Rather stout, usually aculeate. | Branchlets: Rather stout, aculeate. |
| Petioles: 4.5–23 cm. long, soon glabrous, often aculeate. | Petioles: 5–15 (–26) cm. long, densely pubescent with long villous hairs, at length glabrescent or glabrous, usually aculeate. |
| Petiolules: 5–11 mm. long, 0.7–2 mm. in diameter, soon glabrescent or glabrous. | Petiolules: 2–7 mm. long, 0.4–1.5 (–2.5) mm. in diameter, pubescent as petioles. |
| Leaflet-blades: Subcoriaceous, soon glabrescent (the villous rufous hairs on costa and secondaries often persisting), minutely reticulately ceriferous beneath occasionally indistinctly so on old leaflets), often distinctly paler beneath than above, spineless. | Leaflet-blades: Chartaceous, pubescent when young, soon glabrous above, sparsely pubescent or glabrescent beneath, usually spineless, not ceriferous beneath. |
| Terminal leaflets: Rhombic-ovate or rhombic-orbicular, usually longer than broad, 4.4–13 cm. long, 4.2–12 cm. broad, obtuse or acute at apex, broadly cuneate at base. | Terminal leaflets: Deltoid or semiorbicular-deltoid, usually broader than long, 2.7–8.5 (–11.5) cm. long, 3.1–9 (–13) cm. broad, obtuse to acute (rarely rounded) at apex, truncate or nearly so at base. |
| Secondaries: 6–9 per side. | Secondaries: 5–8 per side. |
| Rachis: 6–23 cm. long, shortly pubescent, soon glabrescent proximally. | Rachis: 6–23 cm. long, densely pubescent with long villous rufous hairs, at length glabrescent proximally. |
| Pedicels: 0.2–0.5 cm. long, about 0.7 mm. in diameter, pubescent as rachis. | Pedicels: 0.3–0.5 cm. long, about 0.7 mm. in diameter, pubescent as rachis. |
| Larger bracts: About 2.7 mm. long and 1.3 mm. broad. | Larger bracts: Up to 5.2 mm. long and 1.6 mm. broad. |
| Smaller bracts: Usually 0.9–1.4 mm. long, and 0.4–0.7 mm. broad. | Smaller bracts: Usually ovate, about 1.3 mm. long, and 0.6 mm. broad. |
| Bracteoles: Similar to smaller bracts. | Bracteoles: Similar to smaller bracts, somewhat smaller. |
| Calyx: Subcoriaceous, campanulate or campanulate-tubular, 9–21 mm. long on carinal side, 9–20 mm. long on vexillar side, 2.5–3 mm. broad at base, ampliate to 5.5–8.5 mm. at apex, at margin usually entire (rarely obscurely denticulate or deeply lobed), calcarate (often obscurely so) on the upper carinal side, densely but shortly pubescent with deciduous hairs. | Calyx: Chartaceous, campanulate, 8.5–16 mm. long on carinal side, 8–15 mm. long on vexillar side, 1.5–2.5 mm. broad at base, ampliate to 4.5–7 mm. at apex, at margin regularly 5-denticulate (tooth on the upper carinal side larger than others), pubescent as rachis. |
| Standard: Usually bright red, narrowly elliptic, 4.6–8.4 cm. long, 0.7–1.5 cm. broad, obtuse or rounded, and often retuse at apex cuneate or cuneate-clawed at base. | Standard: Red, sparsely pubescent without, narrowly elliptic, 3.2–6.8 cm. long, 0.7–1.3 cm broad, acute to rounded at apex, cuneate or cuneate-clawed at base. |
| Wings: Rounded and often unguiculate toward apex, occasionally hastate on one side, narrowed or clawed at base, usually longer than (occasionally subequal to) keel petals, 11–19 mm. long, 2–4 mm. broad. | Wings: Usually subcucullate at apex, usually sagittate or hastate on one side and toothed on the opposite side, clawed at base, longer or shorter than keel petals, 7–12.5 mm. long, 3–4 mm. broad. |
| Keel petals: Short- to long-apiculate dorsally at apex, not at all sagittate or hastate, narrowed or clawed at base, 10–17.5 mm. long, 3–5 mm. broad. | Keel petals: Shortly apiculate or acuminate dorsally at apex, sagittate or hastate, clawed at base, 6.5–11.5 mm. long, 3.5–5 mm. broad. |
| Stamens: 4.2–6.4 cm. long, separate for 1–2.6 cm. | Stamens: 2.8–5.8 cm. long, separate for 0.9–1.9 cm. |

| *Erythrina americana* | *Erythrina coralloides* DC. |
|---|---|
| Pistil:<br>  3.6–6.8 cm. long, ovary and gynophore densely pubescent with rather spreading hairs.<br>Fruit—pedicels:<br>  0.7–1.1 cm. long, 1.5–3 mm. in diameter.<br>Pods:<br>  Subligneous, 14–31 cm. long, 1.5–1.9 cm. broad, shallowly, and between some seeds deeply, constricted (not moniliform), more or less straight (usually neither coiled nor much twisted when mature), gradually tapering below into a stipe 4–6.5 cm. long, with an acumination 2–3.5 cm. long, usually many-seeded.<br>Seeds:<br>  Scarlet, with a black line extending from the hilum for 1–2 mm. toward the chalazal end, 10–15 mm. long, 6.5–9-mm. broad. | Pistil:<br>  3.1–6 cm. long, ovary and gynophore densely pubescent with brownish or rufous rather spreading hairs.<br>Fruit—pedicels:<br>  0.5–0.8 cm. long, 2–3 mm. in diameter.<br>Pods:<br>  Ligneous, 12–24 cm. long, 1.4–2 cm. broad, constricted between seeds (not moniliform) with a stipe 2–7 cm. long, with an acumination 2.5–6.5 cm. long, 1-many seeded.<br><br>Seeds:<br>  Scarlet with a black line extending from the hilum for 2.5–4 mm. toward the chalazal end, 14–18 mm. long, 10–10.5 mm. broad. |

The herbarium specimens of *Erythrina americana* and *Erythrina coralloides* DC. on which the foregoing studies were made, were obtained from practically all major herbaria of the world and are now on file at the following institutions: Arnold Arboretum, Harvard University; Botanisches Museum, Berlin-Dahlem, Germany; Bailey Herbarium, Cornell University, Ithaca, New York; Jardin Botanique de l'Etat, Brussels, Belgium; University of California, Berkeley, California; Field Museum of Natural History, Chicago; Gray Herbarium, Harvard University; Royal Botanic Gardens, Kew, England; Missouri Botanical Garden, St. Louis; Jardin Botanico, Madrid, Spain; Botanisches Museum, Munchen, Germany; New York Botanical Garden, Bronx Park, New York; Museum d'Histoire Naturelle, Paris, France; Academy of Natural Sciences, Philadelphia, Pennsylvania; Naturhistoriska Riksmuseet, Stockholm, Sweden; U. S. National Herbarium, Washington.

According to our preferred process for the production of our alkaloid "erythroidine," seeds of *E. americana* are granulated and any oil present therein is removed. The seeds are then extracted with an organic solvent, such as alcohol or the like. After removal of the solvent, the residue is acidified with an acid, as for example, with hydrochloric acid, hydrobromic acid, or the like, after which it is extracted with an organic solvent suitable for the removal of any residual impurity, such as fats. The clarified solution is concentrated in vacuo until the selectively dissolved known alkaloid, hypaphorine, of formula $$C_{14}H_{18}N_2O_2$$

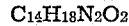

crystallizes out in the form of its salt corresponding to the acid used in the acidulation step. The residual acidified solution remaining after separation of the physiologically inert hypaphorine is weakly alkalinized, preferably with an alkaline metal carbonate, and the alkali solution extracted with an immiscible organic solvent. Our new alkaloid "erythroidine" may be obtained as a salt by treating the alkalized residue with an acid.

In general, our new alkaloid "erythroidine" is preferably obtained from the seeds of *E. americana* after intermediate separation of the known alkaloid, hypaphorine. However, our "erythroidine" may be isolated directly from the *E. americana* seeds by pretreating the latter to remove any fatty oils presents, alkalizing the residual solution, and extracting the alkalized solution with an immiscible organic solvent. The known alkaloid, hypaphorine, may then be obtained from the mother liquors.

Our new alkaloid "erythroidine" may also be obtained directly from the dried flowers of *E. americana*, in the form of a salt, from which the base may be obtained.

The following examples illustrate methods of carrying out the present invention, but it is to be understood that these examples are given by way of illustration and not of limitation.

Example I

About 1025 gms. of ground seeds (40 mesh) of *E. american* are extracted in a Soxhlet apparatus, with ether or petroleum ether to remove fatty oil. The solvent is distilled. About 125 gms. of oil are removed. Traces of alkaloidal material may be recovered from this oil, by treatment with dilute acid, etc. The ground seeds are then exhaustively extracted with a solvent, such as ethanol. The ethanol extract is distilled, finally in vacuo. A residue of about 175 gms. remains. This is dissolved in one liter of water, acidulated, for example, with about 20 ml. of concentrated hydrochloric acid, and extracted with an immiscible solvent to remove the residual suspended fatty oil droplets. The clarified solution is then concentrated in vacuo until the hypaphorine salt crystallizes. The yield is about 25.8 gms.; the hydrochloride melts at about 230°–231° C., with decomposition (uncorr.). The mother liquor is alkalized, for example, with an aqueous solution of sodium bicarbonate, and exhaustively extracted with an immiscible solvent. The solvent is distilled off in vacuo. About 14 gms. of the base remain.

The base may be dissolved in absolute alcohol and treated with dry hydrogen chloride in absolute alcohol to precipitate the hydrochloride. On standing, erythroidine hydrochloride crystallizes, in a yield of about 7.6 gms. It occurs in the form of white needles melting at about 228° C. with decomposition (uncorr.).

By treating the base with other suitable acidifying agents, other salts may be obtained.

Example II

About 300 gms. of dried flowers from *Erythrina americana* (40 mesh) are extracted in a Soxhlet extractor with 1200 ml. of 95% ethanol for about 14 hours. The extract is then filtered, diluted with 250 ml. of water, acidulated with 2 ml. of concentrated hydrochloric acid and concentrated in vacuo to a volume of about 200 ml. This concentrate is diluted again with water, filtered and concentrated in vacuo to 50 ml. After filtering again from flocculent substances, the solution is made alkaline by treatment with a solution of sodium bicarbonate, and extracted several times with chloroform. The chloroform solution is distilled in vacuo and the residue pumped out at 30°–35° C. and 1 mm. pressure. The erythroidine present in the alkaloidal residue is isolated as a salt. For instance, it may be obtained as the hydrochloride by dissolving the residue in absolute ethanol, treating with hydrogen chloride, and diluting with absolute ether until the erythroidine hydrochloride crystallizes. Erythroidine base may be obtained by dissolving the salt in water, making alkaline with a solution of sodium bicarbonate, extracting with chloroform, and removing the solvent.

Modifications may be made in carrying out the present invention without departing from the spirit and scope thereof, and we are to be limited only by the appended claims.

This application is a continuation-in-part of our application Serial No. 155,010, filed July 22, 1937.

We claim:

1. In a process for the production of erythroidine from seeds and dried flowers of *Erythrina americana*, the steps comprising treating such plant parts with a solvent which removes the fatty oils inherent therein, extracting the treated material with alcohol, concentrating the alcohol extract, dissolving the residue thus obtained in acidulated water, weakly alkalinizing the resulting solution, and extracting erythroidine from the weakly alkaline solution with chloform.

2. In a process for the production of erythroidine from seeds and dried flowers of *Erythrina americana*, the steps comprising treating such plant parts with a solvent which removes the fatty oils inherent therein, extracting the treated material with alcohol, concentrating the alcohol extract, dissolving the residue thus obtained in acidulated water, weakly alkalinizing the resulting solution by treatment with an alkali metal carbonate, and extracting erythroidine from the weakly alkaline material with chloroform.

3. In a process for the production of erythroidine, from seeds and dried flowers of *Erythrina americana*, the steps comprising treating such plant parts with a solvent which removes the fatty oils inherent therein, extracting the treated material with alcohol, concentrating the alcohol extract, dissolving the residue thus obtained in acidulated water, weakly alkalinizing the resulting solution by treatment with sodium bicarbonate, and extracting erythroidine from the weakly alkaline solution with chloroform.

4. In a process for the production of erythroidine from seeds and dried flowers of *Erythrina americana*, the step comprising extracting erythroidine from an aqueous weakly alkaline solution, obtained by concentrating an oil-free, erythroidine-containing residue of an alcohol extract of such plant parts, with chloroform.

5. In a process for the production of erythroidine from seeds and dried flowers of *Erythrina americana*, the steps comprising extracting an aqueous weakly alkaline solution of an oil-free, erythroidine-containing residue, obtained by concentrating an alcohol extract of such plant parts, which chloroform, removing the solvent from the chloroform extract, and treating the alkaloid thus formed with an acidulating agent.

6. In a process for the production of erythroidine from seeds and dried flowers of *Erythrina americana*, the steps comprising extracting an aqueous weakly alkaline solution of an oil-free, erythroidine-containing residue, obtained by concentrating an alcohol extract of such plant parts, with chloroform, removing the solvent from the chloroform extract, treating the alkaloid thus formed with an acidulating agent, and recovering erythroidine from the salt thus obtained.

7. In a process for the production of erythroidine from seeds and dried flowers of *Erythrina americana*, the steps comprising treating such plant parts with a solvent which removes the fatty oils inherent therein, extracting the treated material with alcohol, concentrating the alcohol extract, dissolving the residue thus obtained in acidulated water, weakly alkalinizing the resulting solution, extracting erythroidine from the weakly alkalinized solution with chloroform, removing the solvent, and treating the alkaloid thus formed with an acidulating agent.

8. A process for the production of erythroidine from seeds and dried flowers of *Erythrina americana*, comprising treating such plant parts with a solvent which removes the fatty oils inherent therein, extracting the treated material with alcohol, concentrating the alcohol extract, dissolving the residue thus obtained in acidulated water, weakly alkalinizing the resulting solution, extracting erythroidine from the weakly alkalinized solution with chloroform, treating the alkaloid thus formed with an acid, and recovering erythroidine from the salt thus obtained.

9. A process for the production of erythroidine from seeds and dried flowers of *Erythrina americana*, comprising treating such plant parts with a solvent which removes the fatty oils inherent therein, extracting the treated material with alcohol, concentrating the alcohol extract, dissolving the residue thus obtained in acidulated water, weakly alkalinizing the resulting solution by treatment with an alkali metal carbonate, extracting erythroidine from the weakly alkalinized solution with chloroform, treating the alkaloid thus formed with an acid, and recovering erythroidine from the salt thus obtained.

10. A process for the production of erythroidine from seeds and dried flowers of *Erythrina americana*, comprising treating such plant parts with a solvent which removes the fatty oils inherent therein, extracting the treated material with alcohol, concentrating the alcohol extract, dissolving the residue thus obtained in acidulated water, weakly alkalinizing the resulting solution by treatment with sodium bicarbonate, extracting erythroidine from the weakly alkalinized solution with chloroform, treating the alkaloid thus formed with an acid, and recovering erythroidine from the salt thus obtained.

11. As a new composition of matter, a substance selected from the class consisting of the crystalline alkaloid, having the empirical formula $C_{16}H_{19}NO_3$, forming a crystalline hydrochloride melting at about 228° C., and being identical with the alkaloid obtained by the process defined in claim 4, and hydrohalides of such alkaloid.

12. As a new composition of matter, the crystalline alkaloid having the empirical formula $C_{16}H_{19}NO_3$, forming a crystalline hydrochloride melting at about 228° C., and being identical with the alkaloid obtained by the process defined in claim 4.

13. As a new composition of matter, a substance selected from the class consisting of hydrohalides of the crystalline alkaloid, having the empirical formula $C_{16}H_{19}NO_3$, forming a crystalline hydrochloride melting at about 228° C., and being identical with the alkaloid obtained by the process defined in claim 4.

14. As a new composition of matter, the hydrochloride of the crystalline alkaloid, having the empirical formula $C_{16}H_{19}NO_3$, and being identical with the alkaloid obtained by the process defined in claim 4, said hydrochloride being a crystalline substance melting at about 228° C.

RANDOLPH T. MAJOR.
KARL FOLKERS.